Nov. 29, 1927.
W. H. REIMAN
GAUGE
Filed Dec. 17, 1926
1,650,653
2 Sheets-Sheet 1
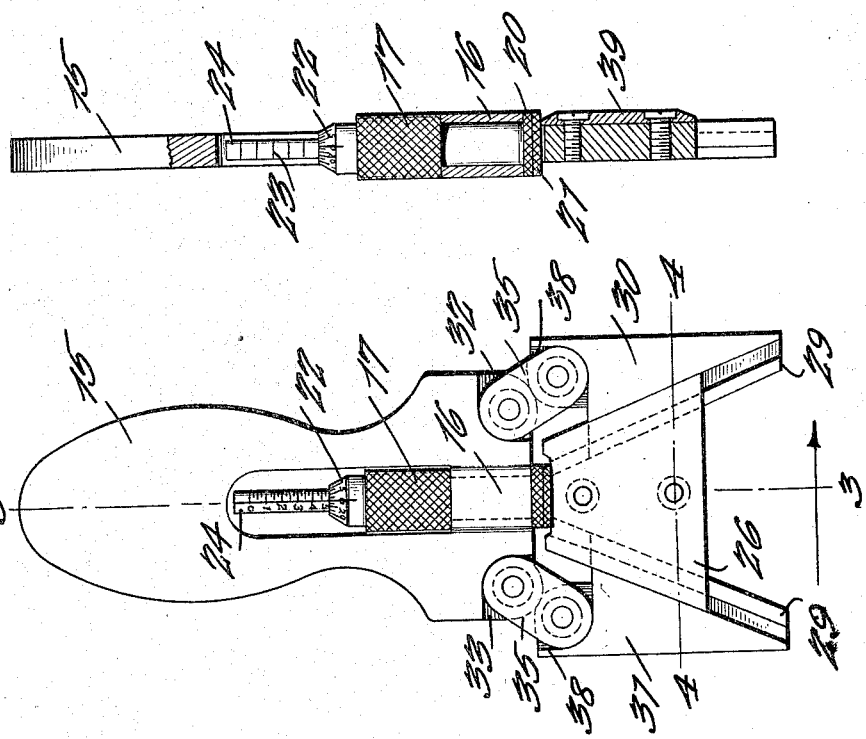
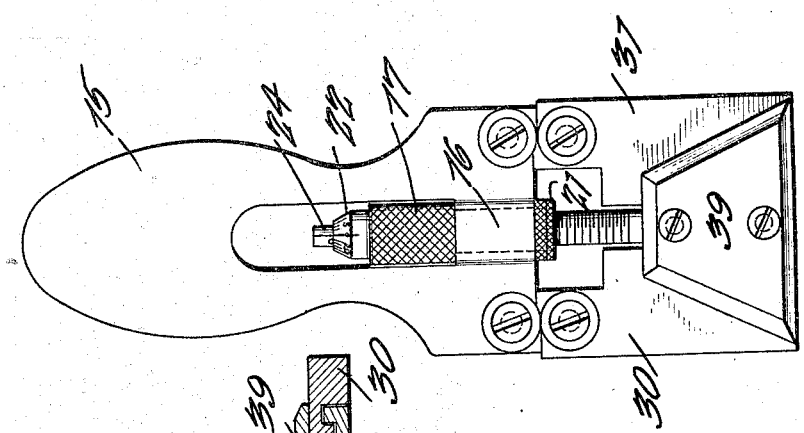
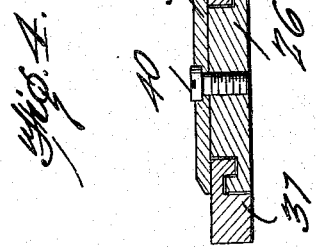
INVENTOR.
William H. Reiman,
BY
Frank S. Appleman,
ATTORNEY.

Nov. 29, 1927.  
W. H. REIMAN  
GAUGE  
Filed Dec. 17, 1926   2 Sheets-Sheet 2
1,650,653
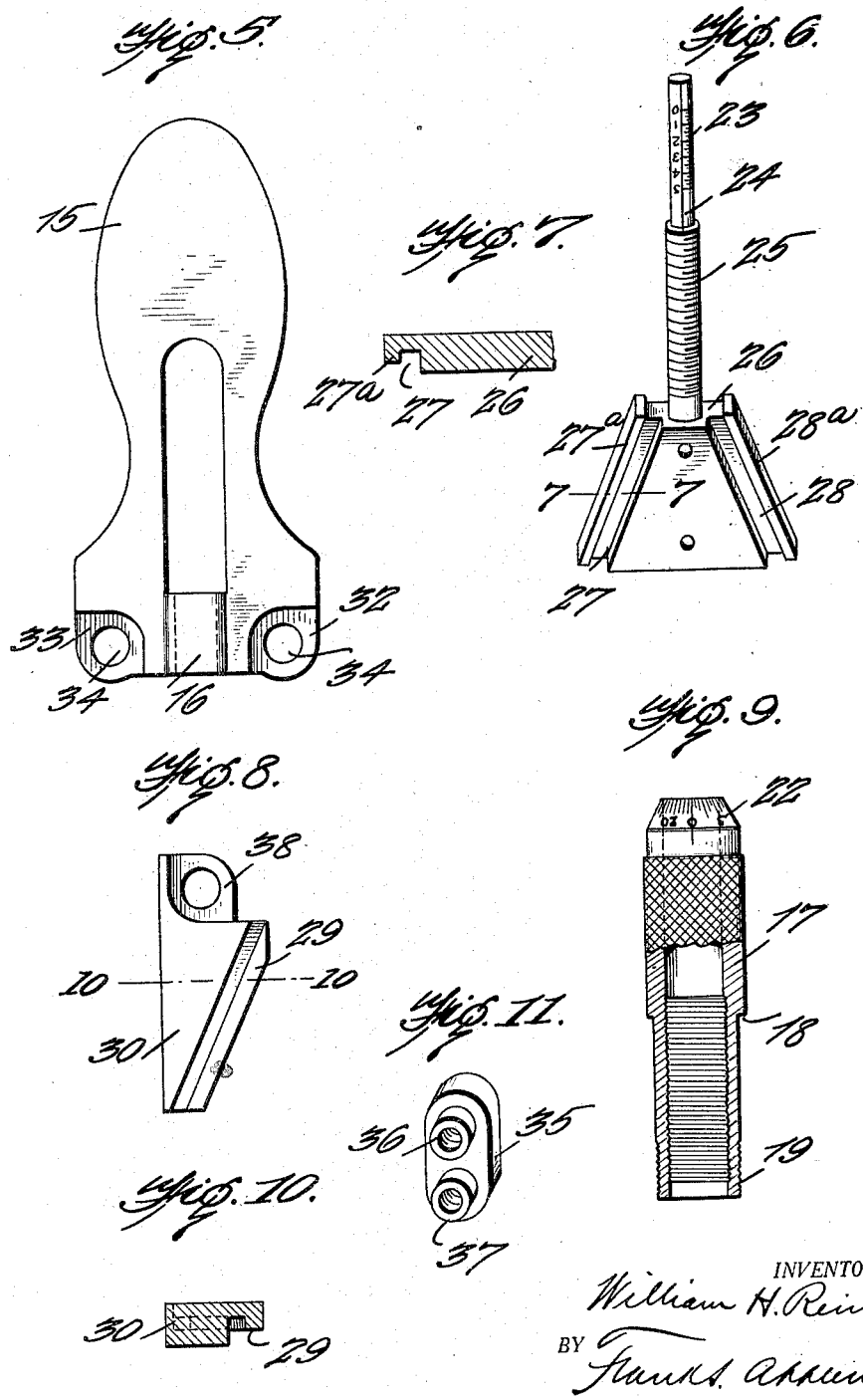
INVENTOR.  
William H. Reiman,  
BY  
ATTORNEY.

Patented Nov. 29, 1927.

1,650,653

UNITED STATES PATENT OFFICE.

WILLIAM H. REIMAN, OF OSWEGO, NEW YORK.

GAUGE.

Application filed December 17, 1926. Serial No. 155,478.

This invention relates to gauges, and the said invention consists of an adjustable plug gauge having micrometer readings.

It is an object of this invention to produce an adjustable gauge which will caliper with perfect accuracy and dimensions between two and two and one-half inches on widths and diameters, although, of course, by increasing the size of the several parts, the capacity of the invention may be increased.

It is a further object of this invention to provide a device comprising comparatively few parts which are of compact arrangement and in which means are provided for expeditious assembly and accurate operation.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a device embodying the invention;

Figure 2 illustrates a similar view of the opposite side thereof;

Figure 3 illustrates a sectional view on the line 3—3 of Fig. 2;

Figure 4 illustrates a sectional view on the line 4—4 of Fig. 2;

Figure 5 illustrates a view in elevation of the handle;

Figure 6 illustrates a view in elevation of the cam and centerpiece;

Figure 7 illustrates a sectional view on the line 7—7 of Fig. 6;

Figure 8 illustrates a view in elevation of one of the jaws;

Figure 9 illustrates a sectional view of an adjusting thimble;

Figure 10 illustrates a sectional view on the line 10—10 of Fig. 8; and

Figure 11 illustrates a perspective view of one of the links.

In these drawings, 15 denotes a handle having a sleeve or tubular portion 16 in which an internally threaded thimble 17 is rotatable, it being shown that the said thimble has an external annular shoulder 18 which, when the parts are assembled, rests against the upper edge of the sleeve 16. The thimble is externally threaded as at 19 and after it has been applied to the sleeve, it is rotatably held therein by a jam nut 20 and a lock nut 21. The sleeve is beveled as at 22 and provided with graduations suitably numbered to denote degrees of rotation or other units of measure, and these are intended to coact with other graduations 23 on a stem 24 which projects from the upper end of the thimble. The stem has an enlarged threaded portion 25 whose threads are engaged by the internal threads of the thimble, and therefore, by rotating the thimble, the stem is raised and lowered.

In the practical embodiment of the invention, the graduations are such that one complete turn of the nut results in an adjustment of twenty-five divisions or twenty-five thousandths (.025) of an inch. Twenty complete turns of the nut results in the adjustment of five hundred thousandths (.500) of an inch, since 20×.025 equals .500. Each graduation on the stem denotes twenty-five thousandths (.025) or one complete turn of the nut. Thus a rapid reading can be made by counting the number of graduations visible on the stem and multiplying by twenty-five, as one complete turn of the nut produces an adjustment of twenty-five thousandths (.025), and one complete turn of the nut also causes the stem to travel the distance of one graduation on the stem, and five turns of the nut will result in moving five graduations, etc.

A centerpiece or block 26 is rigid with the stem and moves up and down as the stem is adjusted. One side of the block is plain and the other side has marginal channels 27 and 28 forming clearances for the reception of ribs 29 of the jaws 30 and 31, it being understood that in producing the channels 27 and 28, ribs 27ª and 28ª are formed which operate in the slots of the jaws so that there is a camming engagement between the block 26 and the said jaws, which causes the jaws to move outwardly or inwardly with respect to each other, when the stem of the block is moved upwardly or downwardly, respectively, by the rotation of the sleeve.

It is seen from an inspection of the drawink that the handle has recesses 32 and 33 at its corners and the said corners are provided with apertures such as 34. Links such as 35 are provided and each link has a trunnion 36 which may rock in an aperture 34 and it also has a trunnion 37 which will rock in an aperture 38 of one of the jaws.

It will be seen from an inspection of Fig. 2 that the links constitute connections between the handle and the jaws and therefore the jaws may move outwardly and inwardly under the influence of the manipulation afforded by the thimble.

The block and jaws are held assembled by a face plate 39 which is secured to the block by an anchoring device 40 such as a screw or the like, and the said face plate extends over portions of the surfaces of the jaws and this serves to retain the ribs of the jaws and the ribs of the block in interengaged positions, as fully shown in Fig. 4.

It will be apparent from an inspection of the drawing that the rotation of the thimble will result in moving the block axially of the head and therefore the interengaging parts of the block and the jaws will cause the jaws to move on their links a certain degree, depending upon the number of rotations imparted to the thimble. By this means, an exact reading of the diameter or distance between the outer edges of the jaws may be determined and these may be used in determining the space occupied by the said jaws.

Where reference is made to the up and down movement of the stem, the description is based upon the positions of parts as illustrated in the drawings, and, of course, if the devices were used in a horizontal position, the movement of the stem would be horizontal. The stem is moved axially regardless of whether it is in vertical, horizontal or inclined positions, so that this explanation is made for the purpose of making the description clear.

I claim:

1. In a gauge, a head having diverging camming elements, jaws having means for engaging the camming elements, links pivotally supporting the jaws, a member supporting the links and with relation to which the head and jaws are movable, and means on the member for moving the head.

2. In a gauge, a handle, links oscillatably mounted on the handle, jaws to which the links are oscillatably connected, means for moving the jaws toward and away from each other including a head having camming engagement with the jaws, means for reciprocating the head relatively to the handle, and graduations for determining the degree of movement of the jaws.

3. In a gauge, a handle, links oscillatably mounted on the handle, jaws to which the links are oscillatably connected, means for moving the jaws toward and away from each other including a head movable relative to the handle and having camming engagement with the jaws whereby they are separated or moved together, a threaded stem on the head, a threaded sleeve rotatably mounted in the handle engaging the threads of the stem, and means for indicating the distance between the outer edges of the jaws.

WILLIAM H. REIMAN.